United States Patent
Shaikh et al.

(10) Patent No.: US 12,034,372 B2
(45) Date of Patent: Jul. 9, 2024

(54) RECONFIGURABLE MULTI-PHASE POWER CONVERTER

(71) Applicant: Apple Inc., Cupertino, CA (US)

(72) Inventors: Sarfraz Shaikh, Swindon (GB); Carlos Andre Faria Calisto, Swindon (GB); Deepesh H. Kamani, Cupertino, CA (US); Vincenzo Bisogno, Swindon (GB)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/484,992

(22) Filed: Sep. 24, 2021

(65) Prior Publication Data

US 2023/0095471 A1 Mar. 30, 2023

(51) Int. Cl.
H02M 3/158 (2006.01)

(52) U.S. Cl.
CPC ................ H02M 3/1584 (2013.01)

(58) Field of Classification Search
CPC .. H02M 3/1582; H02M 3/156; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02J 3/46; H02J 3/38

See application file for complete search history.

(56) References Cited

U.S. PATENT DOCUMENTS

| | | | |
|---|---|---|---|
| 9,065,154 B2 | 6/2015 | Butzmann | |
| 9,577,532 B2* | 2/2017 | Tournatory | ......... H02M 3/1584 |
| 10,050,518 B2 | 8/2018 | Lim et al. | |
| 10,469,064 B2 | 11/2019 | Yabuzaki | |
| 10,965,214 B2* | 3/2021 | Choi | ................ G01R 19/0092 |
| 11,258,364 B2* | 2/2022 | Ng | ......... H02M 1/088 |
| 11,594,961 B2* | 2/2023 | Tschirhart | .......... H02M 3/1584 |
| 2020/0293073 A1 | 9/2020 | Morroni | |
| 2021/0408906 A1* | 12/2021 | Rosolowski | .......... H02M 3/157 |

* cited by examiner

Primary Examiner — Jeffrey A Gblende
(74) Attorney, Agent, or Firm — Kowert, Hood, Munyon, Rankin & Goetzel, P.C.; Dean M. Munyon

(57) ABSTRACT

A reconfigurable multi-phase power converter is disclosed. An apparatus comprises a first primary power converter configured to generate a first regulated supply voltage to a first regulated supply voltage node and a second primary power converter configured to generate a second regulated supply voltage to a second regulated supply voltage node. The apparatus further includes N secondary power converters, wherein N is an integer value of one or more, and a multiplexer circuit configured to select the at least one of the N secondary power converters to provide an output current to one of the first or second regulated supply voltage nodes.

20 Claims, 8 Drawing Sheets

RECONFIGURABLE MULTI-PHASE POWER CONVERTER

BACKGROUND

Technical Field

This disclosure is directed to electronic circuits, and more particularly, to switching power converters.

Description of the Related Art

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include two switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is on, energy is applied to the inductor, allowing the current through the inductor to increase. Such a time period may be referred to as an "on-time period" or a "charge period." During one of these time periods, the inductor stores energy in the form of a magnetic field. When the high-side switch is opened and the low-side switch is closed, energy is no longer being applied to the inductor, and the voltage across the inductor reverses. During these periods, which may be referred to as "off-time periods", the inductor functions as a current source, with the energy stored in the inductor's magnetic field supporting the current flowing into the load. The process of closing and opening the high-side and low-side switches is performed periodically to maintain a desired voltage level on the power supply node.

The power switches included in buck converters may be operated in different modes. In some cases, a buck converter may employ pulse width modulation (PWM), in which the frequency with which the buck converter cycles is fixed, but the period of time that the high-side switch is closed is adjusted based on a comparison of an output voltage of the buck converter to a reference voltage. In other cases, a buck converter may employ pulse frequency modulation (PFM), in which the frequency with which the buck converter cycles (including on-time, off-time, and idle time) is adjusted based on the load current.

Some buck converters may employ multiple inductors driven by respective phase circuits (also referred to as "phase units"). The phase circuits are operated out of phase with each other to better manage power delivered to a load. In order to reduce the area needed for multiple inductors, coupled inductors may be used. As used and described herein, "coupled inductors" refer to two or more inductors that share a common magnetic core. The use of a common magnetic core allows some degree of mutual inductance between the pair of inductors.

SUMMARY

A reconfigurable multi-phase power converter is disclosed. In one embodiment, an apparatus comprises a first primary power converter configured to generate a first regulated supply voltage to a first regulated supply voltage node and a second primary power converter configured to generate a second regulated supply voltage to a second regulated supply voltage node. The apparatus further includes N secondary power converters, wherein N is an integer value of one or more, and a multiplexer circuit configured to select the at least one of the N secondary power converters to provide an output current to one of the first or second regulated supply voltage nodes.

In some embodiments, the configurable multi-phase power converter may include two or more secondary power converters that may be shared with one of the primary power converters. The primary power converters may each provide a first amount of current, while the secondary power converters may each provide a second amount of current that is different from the first amount of current.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a configurable power converter with a number of primary phases and a number of secondary phases that can be shared with ones of the primary phases.

During the design phase of an IC, it is often difficult to anticipate the power requirements. This problem can be compounded by changes to the design as the design phase progresses. Changes to various power rails may be required as a response to various design changes, and this in turn can necessitate redesign of some or all of the power distribution system. This may further lead to non-optimal power distribution solutions on chip.

The present disclosure makes use of the insight that implementation of a flexible power architecture could be used to mitigate at least some of the problems that are necessitated by design changes that change power requirements on an IC. Accordingly, the present disclosure contemplates a configurable, multi-phase DC-DC power converter. In the various embodiments disclosed herein, a configurable, multi-phase power converter may include primary and secondary power converters, wherein the secondary power converters may be shared as phases to be used with ones of the primary power converters. For examples, one embodiment includes two primary converters (which may be referred to as "leader" converters) and a plurality of secondary (or "follower") converters, or phases. The two leader converters may provide respective supply voltages for separate power rails. The embodiment of the multi-phase configurable power converter also includes a multiplexer that allow selection of one or more of the follower converters to be coupled to supply the power rail of either the first leader converter, the second leader converter, or none. When coupled to a particular leader, a follower converter provides additional current for load circuits coupled to that power rail.

The solution provided by various embodiments of the multi-phase, configurable power converter provides flexibility to make changes to a power rail when the load demands change during the design process. For example, if the load current requirements for one power rail decrease while those of another increase, a simple change to the multiplexer configuration can accommodate this change in lieu of redesigning the power distribution system.

The present disclosure is now discussed in further detail with reference to FIGS. 1-7. The discussion begins with a basic diagram of an embodiment of a configurable multi-phase power converter. Examples of power converter configurations per the disclosure are then described. The discussion continues with an example layout of one embodiment of a configurable power converter on an IC, followed by a description of a method depicted in a flow diagram. The description concludes with a discussion of an example system.

Figure 1A:
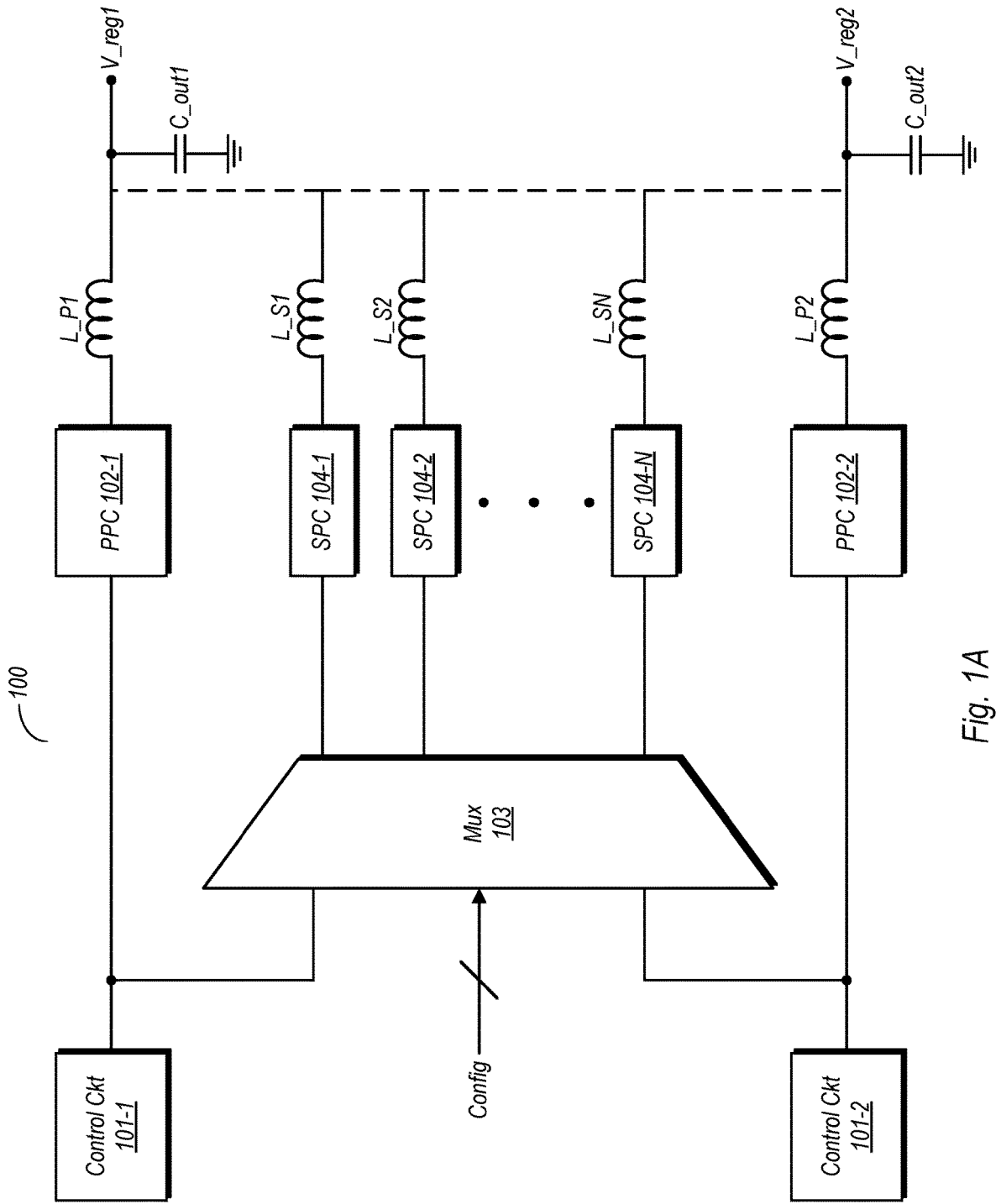
FIG. 1A is a diagram of one embodiment of a configurable, multi-phase power converter.

Configurable Multi-Phase Power Converter Example:

FIG. 1A is a diagram of one embodiment of a configurable, multi-phase power converter. In the embodiment shown, power converter 100 includes a first primary power converter (PPC) 102-1, a second PPC 102-2, and a number of secondary power converters (SPCs) 104-1 to 104-N. Each of the primary and secondary power converters is coupled to a corresponding inductor (e.g., PPC 102-1 is coupled to L_P1, SPC 104-1 is coupled to L_S1, and so on). In the embodiment shown, the various ones of the SPCs 104-1 to 104-N may act as phases for either PPC 102-1 or PPC 102-2.

It is noted that the number of primary and secondary power converters may vary from one embodiment to the next, and are not limited by any of the various examples discussed herein. For example, embodiments with three or four PPCs are also possible and contemplated, and the various ones of the SPCs in such embodiments may be shared among the PPCs 102.

Each of the PPCs 102 in the embodiment shown is coupled to a corresponding control circuit 101. The control circuits may implement various control schemes associated with different types of power converters, e.g., using various ones of suitable voltage control or current control as mechanisms to regulate the supply voltage and load current. Furthermore, the control circuits 101 may operate their respective PPCs 102 in different modes of operations, such as pulse frequency modulation (PFM), pulse width modulation (PWM), and so on.

In various embodiments, the PPCs 102 and SPCs 104 may be switching power converters. Embodiments in which the switching power converters are implemented as buck converters, boost converters, and hybrid buck-boost converters are all possible and contemplated. Accordingly, the switching power converters that may be used to implement PPCs 102 and SPCs 104 may include any appropriate circuitry used to implement such converters, including circuitry that supports the various control mechanisms. Such circuitry may include various types of switches implementing high-side and low-side switches, fly capacitors (in switching converter embodiments that are 3-level or higher), feedback connections, switching control circuits to activate and de-activate the high-side and low-side switches, and so on.

PPC 102-1 in the embodiment shown is configured to generate and provide a first regulated supply voltage on the regulated supply voltage node V_reg1. Meanwhile, PPC 102-2 in the embodiment shown is configured to generate and provide a second regulated supply voltage on regulated supply voltage node V_reg2. The respective regulated supply voltages provided by PPC 102-1 and PPC 102-2 may be different from one another in various embodiments. However, embodiments are possible and contemplated where the specified regulated supply voltage values provided by these two power converters is the same, although their respectively supplied loads may be different. It is further noted that during operation, the regulated supply voltages generated and provided by the various ones of the PPCs 102 may be varied during operation. For example, in an implementation of an IC that utilizes dynamic voltage and frequency scaling (DVFS) as part of a power management scheme, the regulated supply voltage provided by a given one of the PPCs 102 may change in accordance with the power needs of the system at any given time. The changes to a regulated supply voltage in such an embodiment may be put into effect by, e.g., a corresponding control circuit 101 that changes various operating parameters such as switching frequency. The control circuits 101 may in turn be coupled to power management circuitry from which it may receive commands to raise or lower the regulated supply voltage in accordance with needs of the loads to which power is being supplied.

The configurable multi-phase power converter 100 of the embodiment shown also includes a multiplexer 103. In accordance with configuration signals ("Config") received thereby, various ones of the SPCs 104 may be selected to operate as additional phases of a multi-phase power converter in conjunction with a selected one of the PPCs 102. For example, a first combination of configuration signals may cause SPC 104-1 to operate as an extra phase for PPC 102-1, while also causing SPC 104-N to operate as an additional phase to PPC 102-2. The number of given SPCs 104 that can be selected as extra phases for a given PPC 102 is limited only by the total number of SPCs 104 that are present in a given embodiment. Accordingly, a given PPC 102 may have assigned thereto, as extra phases, as few as zero of the SPCs 104 and as many as the total number of SPCs 104 that are present. Furthermore, a number of possible configurations where some SPCs 104 are assigned to one PPC 101 while other SPCs 104 are assigned to another PPC 101 are also possible and contemplated.

It is further contemplated that, in some configurations, selected ones of the SPCs 104 may end up being assigned to none of the PPCs 102 present in the same embodiment, e.g., if it is determine that the extra phases are not needed or desired. In such cases, multiplexer 103 may effectively inhibit the particular SPC 104 from providing current to a regulated supply voltage node associated with one of the PPCs 102.

Although not explicitly shown here, it is understood that each of the inductors L_S1-L_SN may be coupled to switching circuitry to couple it to one of the regulated supply voltage nodes V_reg1 or V_reg2. For example, each of the inductors L_S1 to LS_N may be coupled to a three position switch that couples it to either V_reg1, V_reg2, or neither. More generally, each of the inductors associated with an SPC 104 may be coupled to an M position switch in embodiments where the number of PPCs 102 is M−1. The positions of these various switches may be controlled in accordance with the same configuration signals applied to multiplexer 103.

Figure 1B:
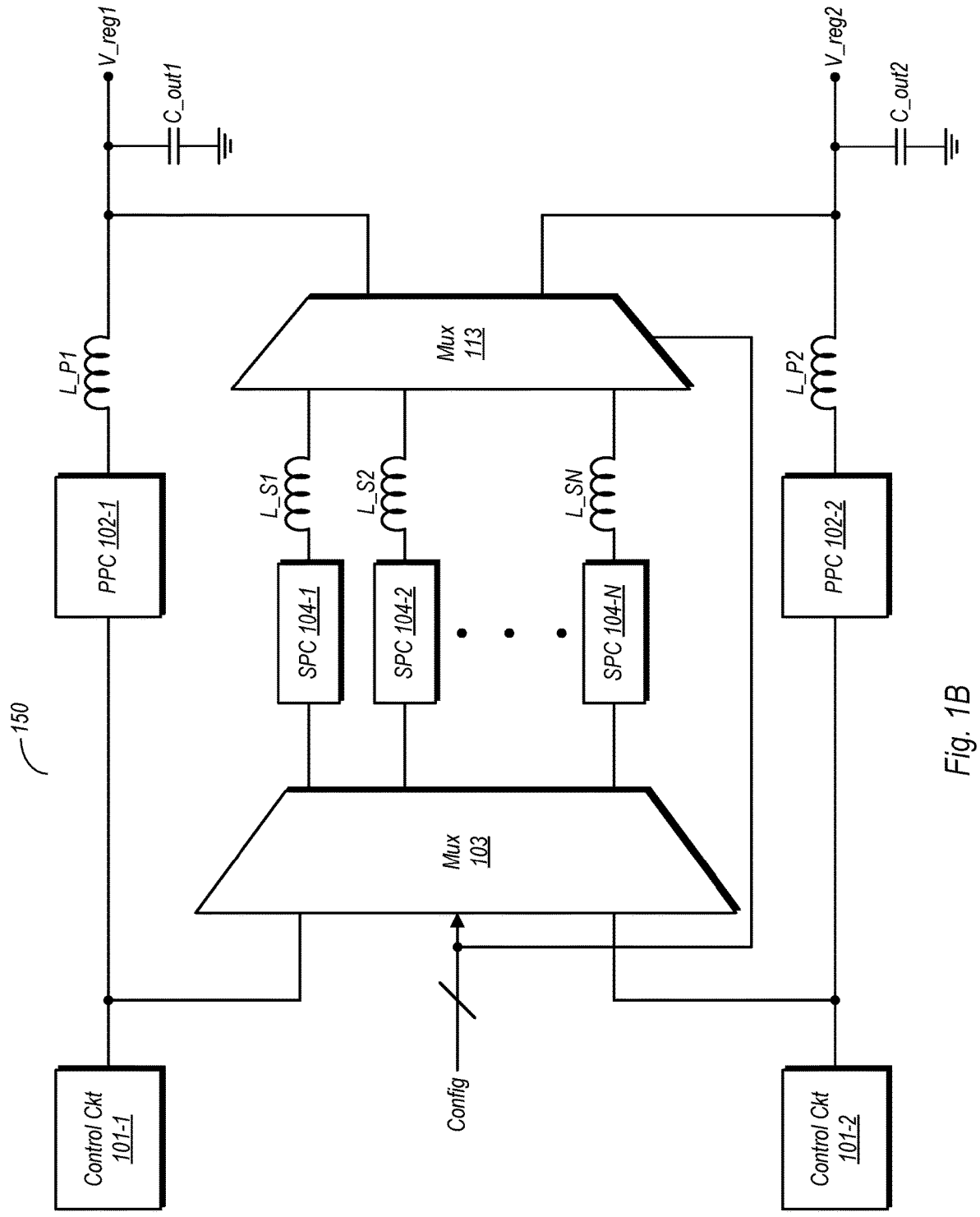
FIG. 1B is a diagram of another embodiment of a configurable, multi-phase power converter.

In various embodiments, when a configuration is set for a particular embodiment of a power converter 100 in accordance with the disclosure, the configuration remains permanent for the life of the IC upon which it is implemented. However, embodiments are also possible and contemplated in which reconfiguration may occur during operations, with particular ones of the SPCs 104 providing extra phases for a PPC 101 at one particular time and to another PPC 101 at another time. FIG. 1B illustrates one such embodiments wherein reconfiguration may occur during operation. In the embodiment shown, power converter 150 includes an extra multiplexer 113 coupled between the inductors L_S1 to L_SN and the regulated supply voltage nodes V_reg1 and V_reg2. Multiplexer 113 may be response to the same configuration inputs as multiplexer 103. However, the presence of multiplexer 113 allows for changing the configuration after power converter 150 has been implemented in silicon and during operation. This may add further flexibility to the configurability of a power converter as disclosed herein. In such embodiments where "on the fly" reconfiguration is possible, limits may be set as to a particular number of SPCs 104 that can be assigned to a given one of the PPCs 102 at a given time in order to ensure that sufficient load current capacity may be provided for the various load circuits receiving both of the regulated supply voltages.

For either of the embodiments disclosed in FIGS. 1A and 1B, when one or more SPCs 104 is assigned to a particular PPC 102 in a given configuration, the result is a multi-phase power converter in which phases may be added (e.g., activated) or shed (e.g., deactivated) in accordance with load current demand. Thus, a corresponding control circuit 101 may activate a particular one of SPCs 104 to provide current to its selected regulated supply voltage node when load current demand necessitates such activation and deactivated when a lesser number of phases can meet the load current demand.

The various ones of the SPCs 104 may be designed such that they are capable of operating in a multi-phase power converter configuration with any of the PPCs 102 of a given embodiment. When operating with a given PPC 102, an SPC 104 may be under control of a corresponding control circuit 101. The control circuit 101 may carry out various control functions to enable the SPC 104 to operate as a phase in the multi-phase power converter. For example, the control circuit 101 may adjust a pulse frequency or a pulse width to enable the particular SPC 104 to provide a desired amount of current, to the regulated supply voltage node of PPC 102 to which it is assigned, at the specified voltage.

The configurable multi-phase converters 100 and 150 as shown in FIGS. 1A and 1B, respectively, and various embodiments thereof, may provide a significant amount of flexibility in designing a power distribution system for an IC, or for an electronic system in general. As power requirements may change as a design evolves, the configurable multi-phase power converter 100 may allow power supply capacity to change and evolve with the design of the various loads, but without having to fully redesign the power distribution system itself.

Figure 2:
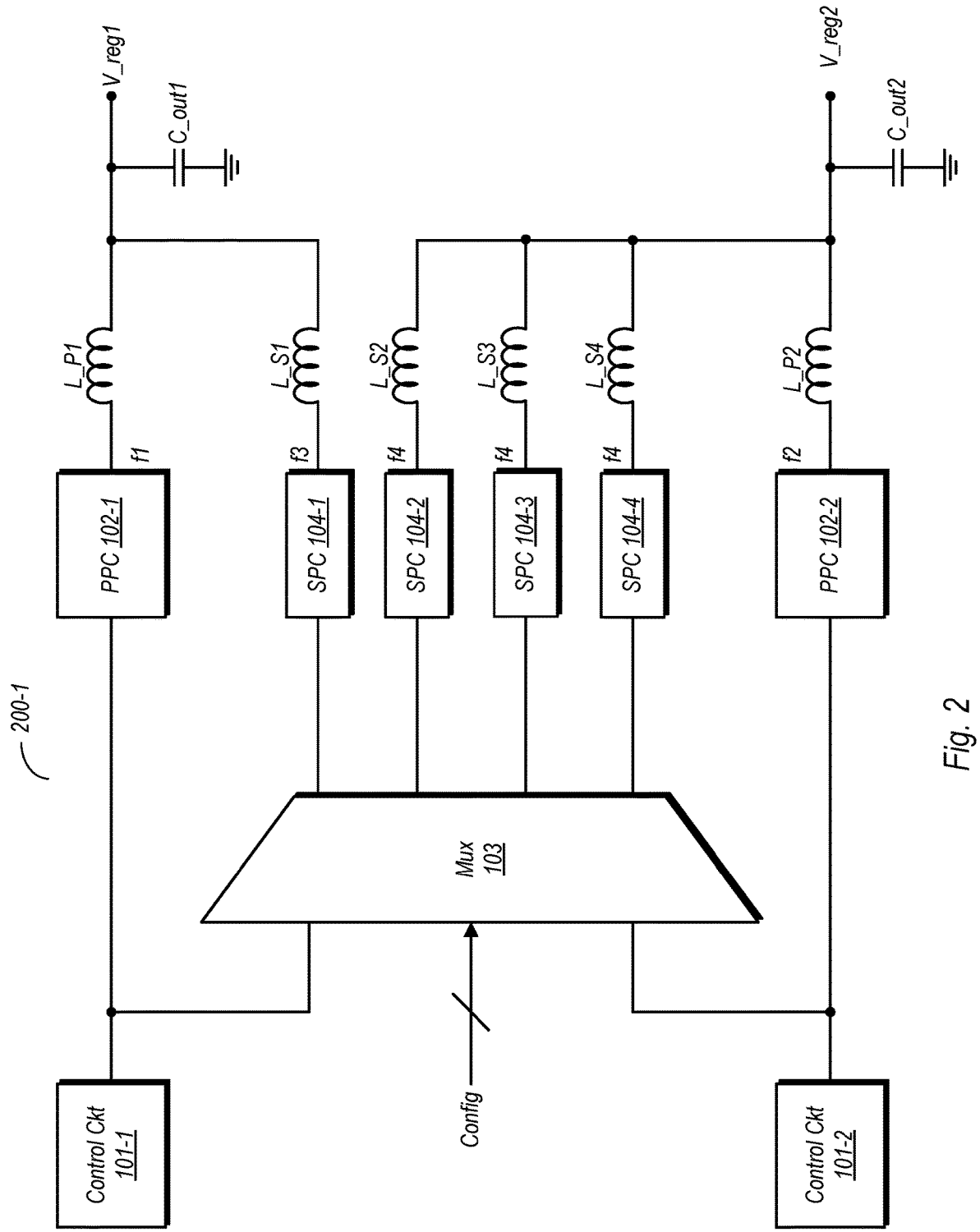
FIG. 2 is a diagram of one embodiment of a configurable, multi-phase power converter in a first configuration.

Example Configurations of One Embodiments of a Configurable Multi-Phase Power Converter:

FIG. 2 is a diagram of one embodiment of a configurable, multi-phase power converter in a first configuration. In the embodiment shown, configurable multi-phase power converter 2001 includes a first PPC 102-1, a second PPC 102-2, and SPCs 102-1 to 102-4. Per the particular configuration shown here, SPC 104-1 acts as a phase in conjunction with PPC 102-1. Accordingly, inductor L_S1 is coupled to V_reg1, along with L_P1. Thus SPC 104-1 acts as an extra phase of a multi-phase power converter that also includes PPC 102-1 and is operated under control of control circuit 101-1.

In this particular configuration of the illustrated embodiment, SPCs 104-2, 104-2, and 104-4 are configured to act as extra phases of a multi-phase power converter including PPC 102-2. Accordingly, inductors L_S2, L_S3, and L_S4 are coupled to V_reg2, along with L_P2.

Thus, the illustrated embodiment of power converter 200-1, configured as shown here, operates as a two different power converters. A first, two-phase power converter is implemented by PPC 102-1 and SPC 104-1. A second, four-phase power converter is implemented by PPC 102-2 and SPCs 104-2, 104-3, and 104-4. With respect to the first two-phase converter, control circuit 101-1 may add or shed the extra phase provided by SPC 104-1 in accordance with varying load current demand. Similarly, control circuit 101-2 may add or shed the various phases implemented by SPCs 104-2, 104-3, and 104-4 in accordance with current demands from loads coupled to V_reg2.

It is noted that the different individual instances of power converters that make up power converter 200-1 may operate at different switching frequencies in switching converter embodiments. In this particular configuration, PPC 102-1 may operate at a switching frequency of f1, while PPC 102-2 may operate at a switching frequency of f2. Meanwhile, SPC 104-1 may operate at a switching frequency of f3, while SPCs 104-2, 104-3, and 104-4 may operate at switching frequency f4. In various embodiments, these frequencies may be different from one another, and frequencies f3 and f4 may be higher than those of either f1 and/or f2. In some embodiments or configurations thereof, some of the switching frequencies may be the same as one another, e.g., f1 and f2 may be the same in certain configurations. It is further noted that the switching frequencies of the various power converters shown here change during operation, such as when switching frequency is changed in a PFM mode to respond to changing current demands or with respect to a change in the regulated output voltage due to, e.g., DVFS, as discussed above.

Figure 3:
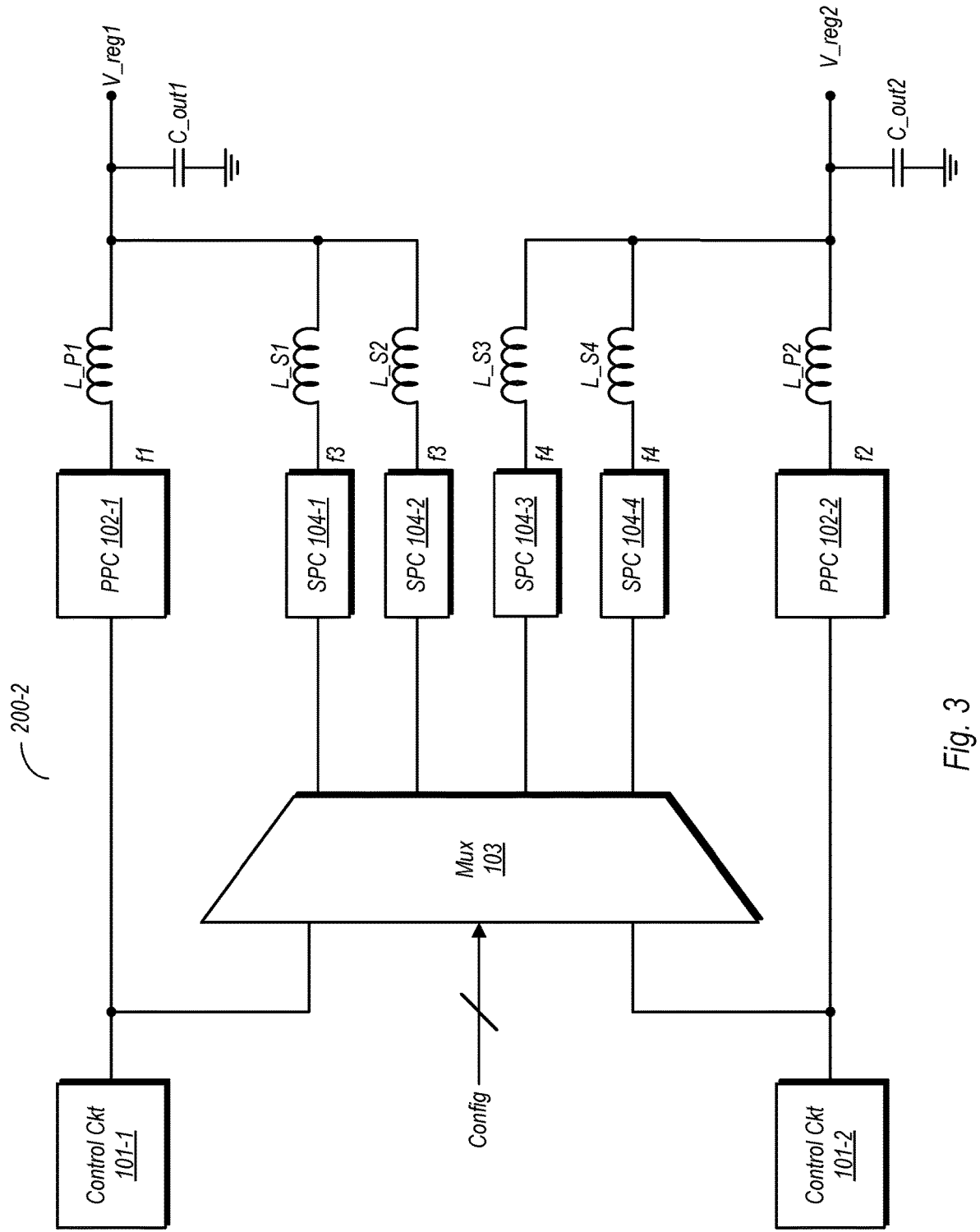
FIG. 3 is a diagram of one embodiment of a configurable, multi-phase power converter in a second configuration.

FIG. 3 is a diagram of an embodiment of a configurable, multi-phase power converter in a second configuration. In the embodiment shown, a power converter 200-2 may be similar to or largely the same as power converter 200-1 discussed above with respect to the number and types of PPCs 102 and SPCs 104 that are available. In this particular configuration of the illustrated embodiment, SPCs 104-1 and 104-2 act as extra phases for PPC 102-1, while SPCs 104-3 and 104-4 act as extra phases for PPC 102-2. Accordingly, the particular configuration for this embodiment results in two separate three-phase power converters, a first of which is under the control of control circuit 101-1 and a second of which is under the control of control circuit 101-2. As with the previous configuration discussed above in reference to FIG. 2, the switching frequencies of the various PPCs 102 and SPCs 104 may be as indicated (f1, f2, and so on), and may be performed at frequencies that are different with respect to one another.

Figure 4:
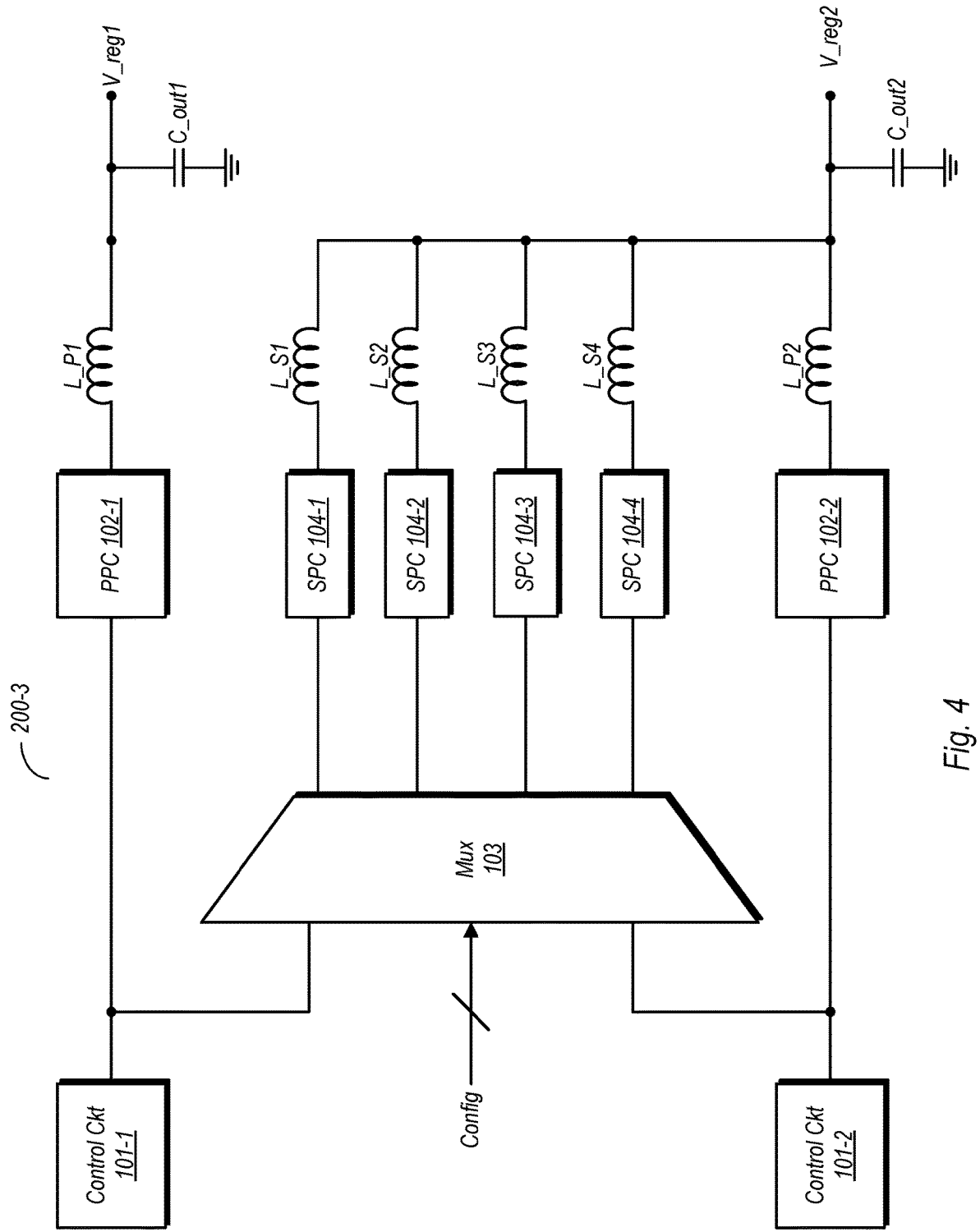
FIG. 4 is a diagram of one embodiment of a configurable, multi-phase power converter in a third configuration.

FIG. 4 is a diagram of one embodiment of a configurable, multi-phase power converter in a third configuration. As with the embodiments of FIGS. 2 and 3, power converter 200-3 in the embodiment shown includes the same number of PPCs 102 and SPCs 104. In this particular configuration of the embodiment shown, each of SPCs 104-1 to 104-4 is arranged to add as an extra phase for PPC 102-2, while no extra phases are provided for PPC 102-1. Accordingly, the configuration shown here results in single phase power converter implemented using PPC 102-1 and a five-phase power converter implemented using PPC 102-2 and SPCs 104-1.

Accordingly, FIGS. 2-4 show three possible configurations for a particular embodiment of a configurable multi-phase power converter. It is note that the disclosure does not limit the illustrated embodiment to these different configurations, and thus other configurations are also possible and contemplated. The limiting factors for any given embodiment of a configurable, multi-phase power converter per this disclosure are the numbers of primary power converters and secondary power converters that are provided. However, within a particular embodiment of a configurable multi-phase power converter as disclosed herein, any possible number of configurations within the limits of the number of primary and secondary power converters are possible. With respect to a given secondary power converter in a particular embodiment, utilization as a phase for any of the available primary power converters is possible and contemplated.

It is noted that while the circuits discussed above may be implemented using NMOS and PMOS transistors, the disclosure is not intended to limit embodiments falling within its scope to these types of devices. Thus, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. Memristors may also be used, where applicable.

Figure 5:
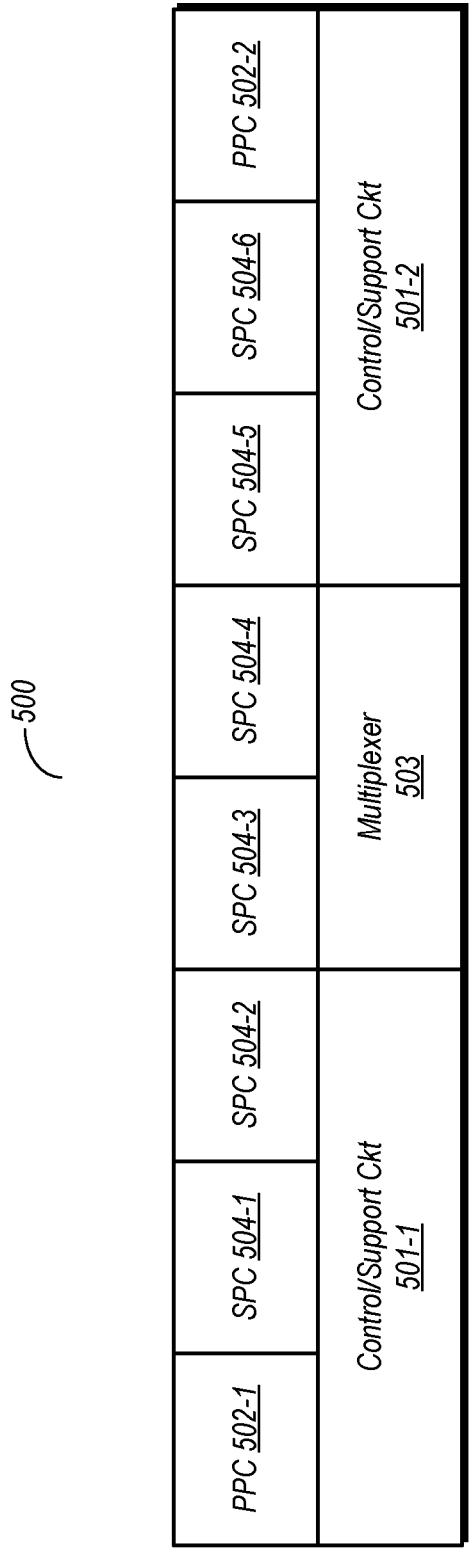
FIG. 5 is a diagram of a floor plan for implementing a configurable, multi-phase power converter on an integrated circuit (IC) die.
Figure 6:
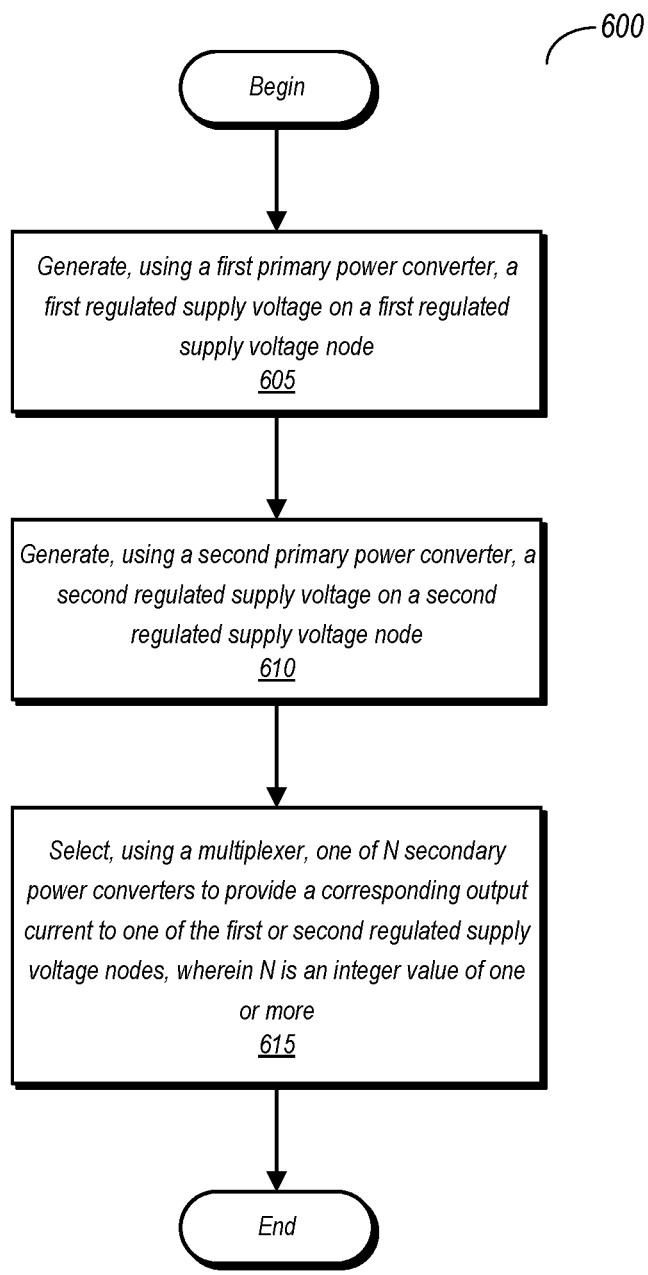
FIG. 6 is a diagram of one embodiment of a method for operation a configurable, multi-phase power converter.

Floor Plan for One Embodiment of a Configurable Multi-Phase Power Converter:

FIG. 5 is a diagram of a floor plan for implementing a configurable, multi-phase power converter on an integrated circuit (IC) die. More particularly, FIG. 5 illustrates how one embodiment of a configurable multi-phase power converter may be implemented on an IC die. In the embodiment shown, configurable multi-phase power converter includes two PPCs 502-1 and 502-2 arranged on the ends, with six SPCs, 504-1 to 504-6 arranged in between the two PPCs 502. FIG. 5 also illustrates the arrangement of a multiplexer 503 with respect to the other components of configurable multi-phase power converter 500. Also illustrated is the relative position of control/support circuits 501-1 and 501-2 relative to the other components. The control/support circuits 501-1 and 501-2 may include the control circuits for their respective PPCs 502, along with supporting circuitry such as level shifters, analog-to-digital converters (ADCs) level shifters, digital circuits (e.g., state machines), and any other circuitry that is used to support the operation of the various configurations of a multi-phase power converter that may be realized by the illustrated embodiment. In some embodiment, an additional multiplexer may be present in order to implement an embodiment of power converter 150 as shown in FIG. 1B Method for Operating a Configurable Multi-Phase Power Converter:

FIG. 6 is a flow diagram illustrating one embodiment of a method for operating a configurable multi-phase power converter. Method 600 may be performed on any of the various embodiments of a configurable multi-phase power converter as discussed above. Embodiments of an apparatus capable of carrying out Method 600 but not otherwise explicitly discussed herein are also considered to fall within the scope of this disclosure.

Method 600 includes generating, using a first primary power converter, a first regulated supply voltage on a first regulated supply voltage node (block 605). The method further includes generating, using a second primary power converter, a second regulated supply voltage on a second regulated supply voltage node. The method further includes selecting, using a multiplexer, one of N secondary power converters to provide a corresponding output current to one of the first or second regulated supply voltage nodes, wherein N is an integer value of one or more (block 615).

In various embodiments, the method includes selecting, using the multiplexer, a first subset of the N secondary power converters to provide corresponding output currents to the first regulated supply voltage node and selecting, using the multiplexer, a second subset of the N secondary power converters to provide corresponding output currents to the second regulated supply voltage node. Embodiments may also includes operating the first primary power converter and the first subset of the N power converters as a first multi-phase power converter, wherein operating the first multi-phase power converter comprises adding and shedding phases in accordance with a first load current demand. These embodiments may further includes operating the second primary power converter and the second subset of the N power converters as a second multi-phase power converter, wherein operating the second multi-phase power converter comprises adding and shedding phases in accordance with a second load current demand.

Embodiments are also contemplated that include a first control circuit associated with the first primary power converter controlling the first subset of the N power converters, and a second control circuit associated with the second primary power converter controlling the second subset of the N power converters.

Various embodiments includes operating the first primary power converter at a first frequency and operating the second primary power converter at a second frequency. Such embodiments may also include operating ones of the first subset of secondary power converters at a third frequency different from the first frequency and operating ones of the second subset of secondary power converters at a fourth frequency different from the second frequency.

Various embodiments of the configurable multi-phase power converter disclosed herein may also include providing the first regulated supply voltage at a first value and providing the second regulated supply voltage at a second value different from the first value.

Figure 7:
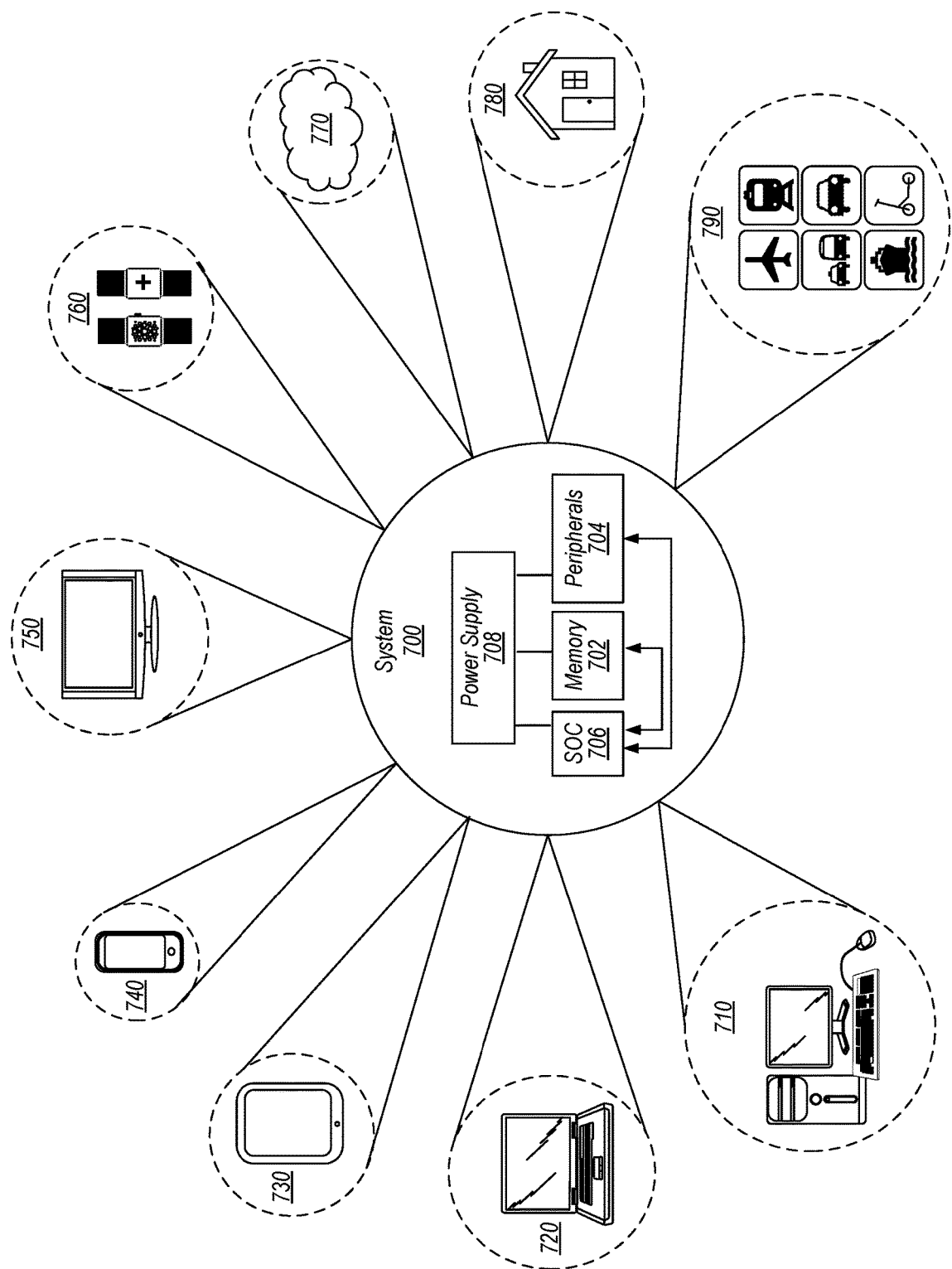
FIG. 7 is a diagram of one embodiment of an example system.

Example System:

Turning next to FIG. 7, a block diagram of one embodiment of a system 700 is shown that may incorporate and/or otherwise utilize the methods and mechanisms described herein. In the illustrated embodiment, the system 700 includes at least one instance of a system on chip (SoC) 706 which may include multiple types of processing units, such as a central processing unit (CPU), a graphics processing unit (GPU), or otherwise, a communication fabric, and interfaces to memories and input/output devices. In some embodiments, one or more processors in SoC 706 includes multiple execution lanes and an instruction issue queue. In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well). SoC 706 in the embodiment shown may additionally include various instances of a multi-phase configurable power converter as disclosed herein.

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch 760 may include a variety of general-purpose computing related functions. For example, smartwatch 760 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure i.e., something physical))). More specifically, this formulation is used to indicate that this structure is arranged to perform the one or more tasks during operation. A structure can be said to be "configured to"

perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first primary power converter configured to generate a first regulated supply voltage to a first regulated supply voltage node based on a first load current demand;
   a second primary power converter configured to generate a second regulated supply voltage to a second regulated supply voltage node based on a second load current demand;
   N secondary power converters, wherein N is an integer value of one or more; and
   a multiplexer circuit configured to select at least one of the N secondary power converters to provide an output current to one of the first or second regulated supply voltage nodes.

2. The apparatus of claim 1, wherein the multiplexer circuit is configured to select a first one of the N secondary power converters to provide a corresponding output current to the first regulated supply voltage node and a second one of the N secondary power converters to provide a corresponding output current to the second regulated supply voltage node.

3. The apparatus of claim 1, wherein the multiplexer circuit is configured to inhibit at least another one of the N secondary power converters from providing a corresponding output current to either of the first or second regulated supply voltage nodes.

4. The apparatus of claim 1, wherein ones of the first and second primary power converters are configured to provide a first amount of current, and wherein the at least one of the N secondary power converters is configured to provide a second amount of current, wherein the second amount of current is different from the first amount of current.

5. The apparatus of claim 1, wherein the first regulated supply voltage is different from the second regulated supply voltage.

6. The apparatus of claim 1, wherein the first primary power converter includes a first control circuit and wherein the second primary power converter includes a second control circuit, wherein the first control circuit is configured to control ones of the N secondary power converters selected to provide output current to the first regulated supply voltage node, and wherein the second control circuit is configured to control ones of the N secondary power converters selected to provide output current to the second regulated supply voltage node.

7. The apparatus of claim 6, wherein the first primary power converter and ones of the N secondary power converters selected to provide output current to the first regulated supply voltage node are configured to operate as a first multi-phase power converter, and wherein the second primary power converter and ones of the N secondary power converters selected to provide output current to the second regulated supply voltage node are configured to operate as a second multi-phase power converter.

8. The apparatus of claim 7, wherein the first control circuit is configured to control a number of active phases of the first multi-phase power converter according to the first load current demand, and wherein the second control circuit is configured to control a number of active phases of the second multi-phase power converter according to the second load current demand.

9. The apparatus of claim 1, wherein the first and second primary power converters are configured to operate at a first switching frequency, and wherein ones of the N secondary power converters are configured to operate at a second switching frequency different from the first switching frequency.

10. The apparatus of claim 1, wherein the first and second primary power converters and the N secondary power converters are buck converters.

11. A method comprising:
    generating, using a first primary power converter, a first regulated supply voltage on a first regulated supply voltage node according to a first load current demand;
    generating, using a second primary power converter, a second regulated supply voltage on a second regulated supply voltage node according to a second load current demand; and
    selecting, using a multiplexer, one of N secondary power converters to provide a corresponding output current to one of the first or second regulated supply voltage nodes, wherein N is an integer value of one or more.

12. The method of claim 11, further comprising:
    selecting, using the multiplexer, a first subset of the N secondary power converters to provide corresponding output currents to the first regulated supply voltage node; and
    selecting, using the multiplexer, a second subset of the N secondary power converters to provide corresponding output currents to the second regulated supply voltage node.

13. The method of claim 12, further comprising:
    operating the first primary power converter and the first subset of the N secondary power converters as a first multi-phase power converter, wherein operating the first multi-phase power converter comprises adding and shedding phases in accordance with the first load current demand; and
    operating the second primary power converter and the second subset of the N secondary power converters as a second multi-phase power converter, wherein operating the second multi-phase power converter comprises adding and shedding phases in accordance with the second load current demand.

14. The method of claim 13, further comprising a first control circuit associated with the first primary power converter controlling the first subset of the N secondary power converters, and a second control circuit associated with the second primary power converter controlling the second subset of the N secondary power converters.

15. The method of claim 13, further comprising:
    operating the first primary power converter at a first frequency;
    operating the second primary power converter at a second frequency;
    operating ones of the first subset of secondary power converters at a third frequency different from the first frequency; and
    operating ones of the second subset of secondary power converters at a fourth frequency different from the second frequency.

16. The method of claim 11, further comprising:
    providing the first regulated supply voltage at a first value; and
    providing the second regulated supply voltage at a second value different from the first value.

17. A system comprising:
- a first power converter configured to provide a first regulated supply voltage to a first load circuit via a first regulated supply voltage node according to a first load current demand;
- a second power converter configured to provide a second regulated supply voltage to a second load circuit via a second regulated supply voltage node according to a second load current demand;
- a multiplexer circuit; and
- a plurality of auxiliary power converters, wherein the multiplexer circuit is configured to couple at least a first subset of the auxiliary power converters to provide current to the first load circuit via the first regulated supply voltage node, wherein the first power converter and the first subset of auxiliary power converters are configured to operate as a first multi-phase power converter.

18. The system of claim 17, wherein the multiplexer circuit is further configured to couple at least a second subset of the auxiliary power converters to provide current to the second load circuit via the second regulated supply voltage node, wherein the second power converter and the second subset of auxiliary power converters are configured to operate as a second multi-phase power converter.

19. The system of claim 18, further comprising a first control circuit associated with the first power converter, wherein the first control circuit is configured to add or shed phases of the first multi-phase power converter in accordance with the first load current demand by the first load circuit, wherein adding or shedding phases of the first multi-phase power converter comprises activating or deactivating ones of the first subset of auxiliary power converters.

20. The system of claim 18, wherein the first multi-phase power converter is configured to provide the first regulated supply voltage at a first value and wherein the second multi-phase power converter is configured to provide the second regulated supply voltage at a second value, wherein the second value is different from the first value.

* * * * *